No. 620,083. Patented Feb. 21, 1899.
O. ASCHE.
MACHINE FOR SOLDERING TIN CANS.
(Application filed July 18, 1898.)
(No Model.) 2 Sheets—Sheet 1.

WITNESSES

INVENTOR
Otto Asche
by G. Dittmar
Attorney

No. 620,083. Patented Feb. 21, 1899.
O. ASCHE.
MACHINE FOR SOLDERING TIN CANS.
(Application filed July 18, 1898.)
(No Model.) 2 Sheets—Sheet 2.

WITNESSES
INVENTOR
Otto Asche
by G. Dittmar
Attorney

UNITED STATES PATENT OFFICE.

OTTO ASCHE, OF PARIS, FRANCE, ASSIGNOR TO THE SOCIETE DE SOUDAGE, OF SAME PLACE.

MACHINE FOR SOLDERING TIN CANS.

SPECIFICATION forming part of Letters Patent No. 620,053, dated February 21, 1899.

Application filed July 18, 1898. Serial No. 686,249. (No model.)

*To all whom it may concern:*

Be it known that I, OTTO ASCHE, a citizen of the French Republic, residing at Paris, in the Republic of France, have invented certain new and useful Improvements in Machines for Soldering Tin Cans, (for which applications have been filed in France May 17, 1898, and in Germany May 30, 1898;) and I do hereby declare the following to be a full, clear, and exact description of the invention, such as will enable others skilled in the art to which it appertains to make and use the same.

The present invention comprises an improvement on the machine described in my United States Patent No. 552,809, and has for its object to guide the cans to be soldered either over the heating and cooling surfaces or to guide them along in the apparatus under the same. In the accompanying drawings I represent these two forms of apparatus.

Figure 1:
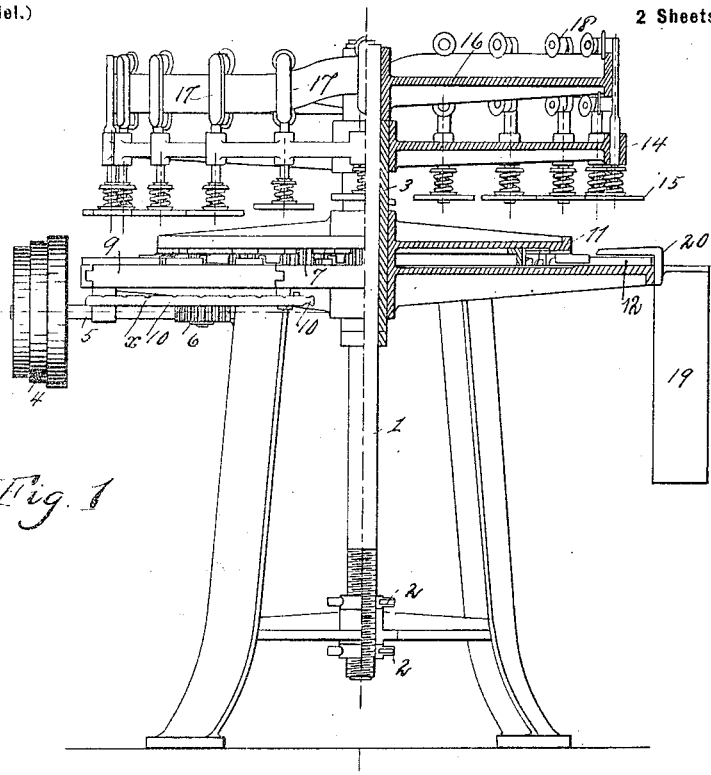
Figure 2:
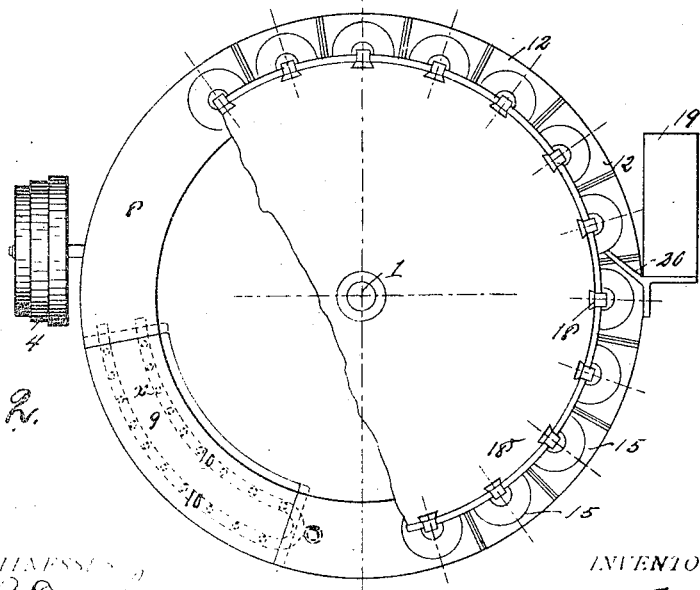
Figure 3:
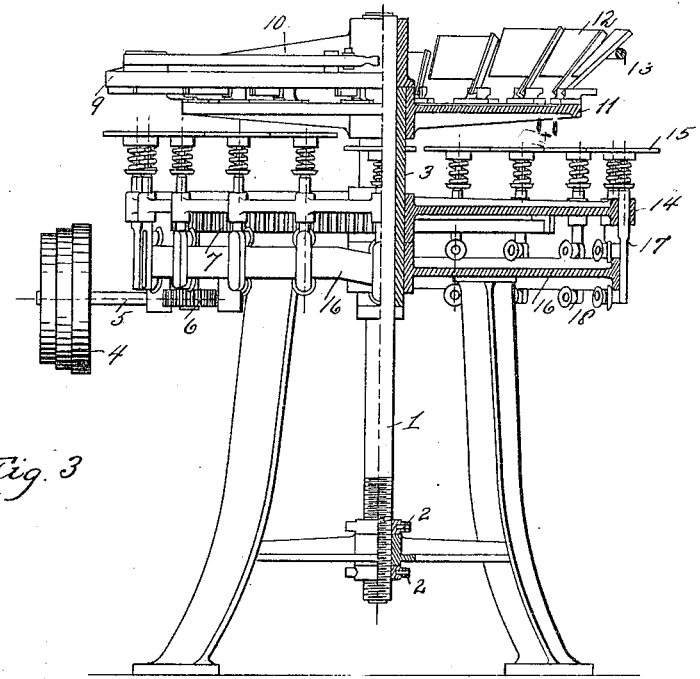
Figure 4:
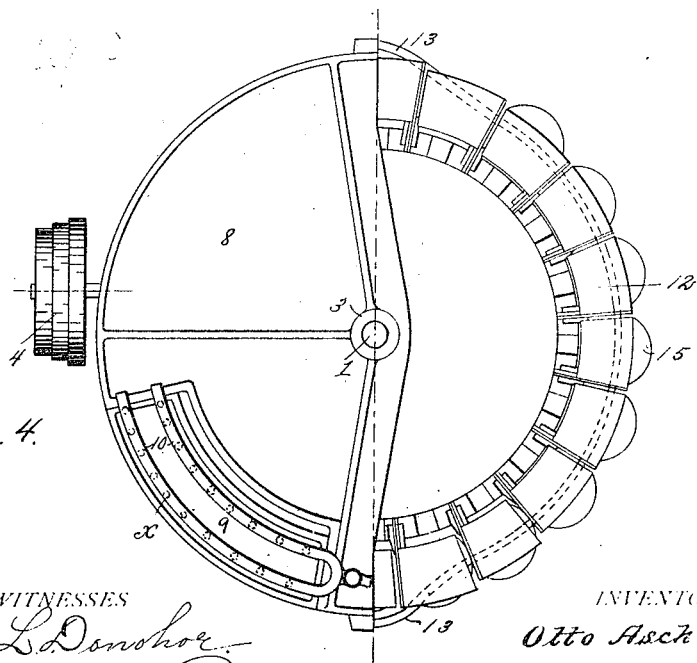

Figure 1 is a side elevation, partly in section, of a machine in which the tin cans are gliding over the heating and cooling surfaces; and Fig. 2 is a plan view of the same. Fig. 3 shows the second form in side elevation, partly in section, the cans being guided in this machine below the heating and cooling surfaces. Fig. 4 is a plan view.

The general elements in the machine hereinafter described are the same as in my Patent No. 552,809.

1 is a vertical shaft, which can be adjusted in height by means of nuts 2 2.

3 is a long sleeve fitted to the shaft 1 and carrying the revolving plates or tables.

4, 5, 6, and 7 is the driving mechanism, of ordinary and well-known construction.

8 are the cooling-tables, and 9 are the heating-tables, provided with a tube or tubes 10, having openings *x*, so as to constitute a gas-burner. The cooling-tables 8 may be simply metallic masses adapted to quickly take up ordinary temperature, and gas can be supplied to the burner-tubes in any convenient manner and from any suitable source.

11 is a table carrying plates 12, (best shown in Figs. 3 and 4,) the object of said plates being to minimize friction, as hereinafter described, and to transmit heat in one or the other direction.

13, Figs. 3 and 4, is a guide serving to lift the plates 12 and to allow them to fall down again.

14 is a table carrying the supporting-plates 15 for the cans, pressing upon the latter either from above, as in Figs. 1 and 2, or from below, as in Figs. 3 and 4.

16 is a cam or guide serving to raise and to lower the plates 15 by means of rods 17, being guided in sleeves of the table 14, and by means of rollers 18, running on the top and bottom edges of the guide 16.

19 is a slide or chute, upon which the soldered cans are guided by a finger 20 and down which they slide to be received into a basket or other receptacle.

It is well known that when the cans pass in direct contact over the heated surface a friction of quite a high degree is established, due to the can ends having a tendency to stick or adhere to the heated surface. I obviate this inconvenience, or rather defect, by providing the plates 12, as shown in the drawings. Said plates are hinged or otherwise movably secured to the edge of the table 11. In the construction shown in Figs. 3 and 4 the plates 12 rest on the tops of the cans and are intermediate the latter and the heated surface during the soldering operation. They thus serve to prevent any friction that would otherwise occur. While answering this purpose, it is obvious that the plates are susceptible of transmitting sufficient heat to readily melt the solder. As the cans continue around the machine the guide 13 serves to lift the plates 12, so that the cans can be readily removed upon reaching the point of discharge.

The two constructions are duplicates of each other except that in Figs. 1 and 2 the cans travel above the heating and cooling surfaces, while in Figs. 3 and 4 the reverse arrangement is shown. Here also in Figs. 3 and 4 I employ the guide 13 to raise the plates 12, whereby the removal of the soldered cans is facilitated. This guide is omitted in the former construction.

The operation of my improved machine is easily understood. The cans are placed upon the plates 15 when the guide 16 has compressed the respective springs. Thereupon the guide allows the springs to expand, and the can under pressure is guided first along the heating and then along the cooling surface, so that the solder melts and binds the parts together in the manner described in my patent aforementioned. Thus the cans are under compression during one quarter of a revolution while passing over or under the heating-table, and then during another quarter of a revolution of the machine they are presented against the cooling-table, and finally they are discharged from the machine during the remaining one-half revolution by hand, or they are discharged automatically by the finger 20.

Having thus described my invention, I claim as new, and desire to secure by Letters Patent of the United States, the following:

1. In apparatus for soldering tin cans, the combination of a frame, a camway mounted on said frame, a carrier adapted to be guided by said camway, flexible can-holders on said carrier, a heating-surface, a cooling-surface and suitable mechanism for bringing the prepared can ends into contact with said surfaces consecutively, substantially as described.

2. In apparatus for soldering tin cans, the combination of a carrying means provided with flexible can-holders, a camway around which said carrier is guided, a heating-surface, a cooling-surface, and suitable mechanism for bringing the prepared can ends into contact with said surfaces, substantially as specified.

3. In apparatus for soldering tin cans, the combination of a carrying means provided with flexible can-holders, a camway around which said carrier is guided, a heating-surface, a cooling-surface, mechanism for bringing the prepared can ends into contact with said surfaces, an antifriction means coacting with such mechanism and suitable means for discharging the soldered cans, substantially as described.

4. In apparatus for soldering tin cans, the combination of a frame, a camway carried by said frame, a carrier suitably guided over said camway, flexible can-holders carried thereon, a heating-surface and a cooling-surface arranged below the line of travel of said carrier, means for imparting motion to said carrier and for bringing the prepared can ends into contact with said surfaces, consecutively, an antifriction device coacting therewith, and means for automatically discharging the soldered cans, substantially as described.

In testimony whereof I affix my signature in presence of two witnesses.

OTTO ASCHE.

Witnesses:
EUGÈNE BRILLIÉ,
EDWARD P. MACLEAN.